United States Patent [19]

Lammers et al.

[11] Patent Number: 5,079,208

[45] Date of Patent: Jan. 7, 1992

[54] SYNTHETIC, MACROPOROUS, AMORPHOUS ALUMINA SILICA AND A PROCESS FOR REFINING GLYCERIDE OIL

[75] Inventors: Jannes G. Lammers, Retthorn Ganderkesee, Fed. Rep. of Germany; Jan W. Groeneweg, Leiden, Netherlands

[73] Assignee: Van den Bergh Foods Co., Division of Conopco, Inc., Lisle, Ill.

[21] Appl. No.: 454,881

[22] Filed: Dec. 22, 1989

[30] Foreign Application Priority Data

Dec. 30, 1988 [EP] European Pat. Off. ......... 88203038.0

[51] Int. Cl.$^5$ .......................... B01J 20/16; B01J 21/12
[52] U.S. Cl. ..................................... 502/238; 502/263
[58] Field of Search ....................... 502/233, 238, 263; 423/327

[56] References Cited

U.S. PATENT DOCUMENTS

| | | | |
|---|---|---|---|
| 2,933,456 | 4/1960 | Braithwaite | 502/238 |
| 3,066,092 | 11/1962 | Winyall | 502/238 |
| 3,650,989 | 3/1972 | Hindin et al. | 502/238 |
| 4,049,686 | 9/1977 | Ringers et al. | |
| 4,629,588 | 12/1986 | Welsh | |
| 4,880,574 | 11/1989 | Welsh | |
| 4,959,338 | 9/1990 | Miura et al. | 502/238 |

FOREIGN PATENT DOCUMENTS

| | | | |
|---|---|---|---|
| 545045 | 8/1957 | Canada | 502/233 |
| 0269173 | 6/1988 | European Pat. Off. | |
| 1349409 | 4/1974 | United Kingdom | |
| 2168373 | 6/1986 | United Kingdom | |

Primary Examiner—Carl F. Dees
Attorney, Agent, or Firm—Rimma Mitelman

[57] ABSTRACT

Alumina silicas for refining glyceride oils having a surface area of at least 150 m$^2$/g and a pore volume of 0.6 ml/g in pores having a pore diameter of about 4–20 nm, exhibiting a phosphorous removal capacity of more than 100 ppm P/1% in combination with a sufficient bleaching activity. These silicas should be prepared at temperatures for the acid treatment, hydrogel treatment, and alumina silica formation of 35°–55° C.

36 Claims, No Drawings

SYNTHETIC, MACROPOROUS, AMORPHOUS ALUMINA SILICA AND A PROCESS FOR REFINING GLYCERIDE OIL

The present invention relates to novel synthetic, macroporous, amorphous alumina silica, to a preparation method therefor, and to a process for refining glyceride oil, in which this synthetic, amorphous alumina silica is used.

Glyceride oils of in particular vegetable origin, such as soybean oil, rapeseed oil, sunflower oil, safflower oil, cotton seed oil and the like, are valuable raw materials for the food industries. These oils in crude form are usually obtained from seeds and beans by pressing and/or solvent extraction.

Such crude glyceride oils mainly consist of triglyceride components. However, they generally also contain a significant amount of non-triglyceride components including phosphatides (gums), waxy substances, partial glycerides, free fatty acids, colouring materials and small amounts of metals. Depending on the intended use of the oil, many of these impurities have an undesirable effect on the quality, such as (storage) stability, taste, and colour, of later products. It is therefore necessary to refine, i.e. to remove the gums and other impurities from the crude glyceride oils as much as possible.

In general the first step in the refining of glyceride oils is the so-called degumming step, i.e. the removal of among others the phosphatides. In conventional degumming processes water is added to the crude glyceride oil to hydrate the phosphatides, which are subsequently removed e.g. by centrifugal separation. Since the resulting degummed oil often still contains unacceptably high levels of "non-hydratable" phosphatides, this water-degumming step is normally followed by chemical treatments with acid and/or alkali to remove the residual phosphatides and to neutralize the free fatty acids ("alkali-refining"). Subsequently, the soapstock so formed is separated from the neutralized oil by centrifugal separation or settling. The resulting oil is then further refined using bleaching and deodorizing treatments.

After the above-described water-degumming step in general residual phosphorous levels are achieved in the order of 100-250 mg/kg. By the improved degumming method as described in U.S. Pat. No. 4,049,686 in which the crude or water-degummed oil is treated with a concentrated acid such as in particular citric acid, residual phosphorous levels can be brought down to within the range of from 20-50 mg/kg.

In general, the lower the amount of the residual phosphatides after the degumming step the better or easier the subsequent refining steps. In particular, a low phosphatide level after degumming results in easier "chemical refining" in the alkali-refining step or even may open the possibility to avoid the alkali-refining step altogether, in which case the oil is only further refined by means of bleaching and steam-refining. A refining process sequence which does not involve an alkali treatment and subsequent removal of soapstock is often referred to as "physical refining", and is highly desirable in terms of processing simplicity and yield.

Bleaching or adsorbent-extraction of oils to remove colour or colour-precursors, residual phosphatides, soap and trace metal contaminants is well-known and is a generally applied step in oil refining processes. A variety of adsorbents have been proposed in the prior art, including bleaching earths (hydrated alumina silicas), such as the natural bleaching earth known as fuller's earth, and acid-activated clays, in particular, acid-treated bentonites or mohtmorillonites, activated charcoal, silica gels and the like.

In GB 2,168,373 there is described a process for the removal of trace contaminants, such as phospholipids and associated metal ions, which involves the treatment of degummed oil with a suitable amount of amorphous silica. Suitable amorphous silicas are disclosed to have an average pore diameter of at least 6 nm, and may be gels, precipitated, dialytic and fumed.

GB-B-1,349,409 discloses synthetic metal-oxide silicas for bleaching oil having a specific surface of 300-600 $m^2/g$ and a fraction of micropores (less than 140 Å in mean diameter) of at least 0.35 ml/g.

EP-A-269,173 discloses synthetic metal-oxide silicas for use as synthetic bleaching earths in oil refining. These synthetic silicas were prepared in a three-step preparation method in which the temperature in each preparation step was maintained at 30° C. The silicas prepared have a surface area of 124-240 $m^2/g$ in pores having a radius between 2.0 and 4.0 nm, and a pore volume of about 1 ml/g in pores having a radius of 100-2,000 nm.

It has now been found that specific macroporous, synthetic, amorphous alumina silicas having specific texture characteristics and/or prepared according to a specific preparation method exhibit excellent results in the removal of residual trace contaminants, such as phosphorous containing compounds and their associated metal ions, colouring compounds, and oxidized material from glyceride oils, particularly degummed oils.

Accordingly, the present invention provides novel synthetic, macroporous, amorphous, alumina silicas having a surface area of at least 150 $m^2/g$, and a pore volume of at least 0.6 ml/g in pores having a pore diameter in the range of about 4-20 nm.

These synthetic, macroporous, amorphous alumina silicas have textural properties optimized for the removal of these residual trace contaminants, specifically phosphorous containing compounds, notably phosphatides.

In order to maintain a sufficient bleaching action, these alumina silicas according to the invention should have a sufficient large pore volume in pores having a pore diameter in the range of 4-20 nm. When the pore volume is below 0.6 ml/g, the bleaching activity will decrease to a non-acceptable level from a refining point of view. Preferably the pore volume is at least 0.65 ml/g in pores having a pore diameter in the range of about 4-20 nm. Generally, the pore volume is in the range of 0.65-1.0 ml/g, and preferably in the range of about 0.7-0.9 ml/g in pores having a pore diameter in the range of about 4-20 nm. The total pore volume for these alumina silicas is generally 2-4 ml/g, but preferably 2.7-3-5 ml/g.

The surface area in the alumina silicas according to the invention is preferably at least 175 $m^2/g$, more preferably 200 $m^2/g$ in pores having a pore diameter in the range of about 4-20 nm. Generally, the surface area is in the range of 150-300 $m^2/g$, more preferably 200-300 $m^2/g$, most preferably 200-250 $m^2/g$ in pores having a pore diameter in the range of about 4-20 nm.

This removal of phosphatides is herein referred to as phosphorous removal capacity and expressed as mg/kg P/1% by wt alumina silica. These alumina silicas have a phosphorous removal capacity from glyceride oil of more than 100 mg/kg P/1%. Preferably the phosphorus capacity lies within the range of 150-200 mg/kg P/1%.

In order to produce an alumina silica which is sufficiently macroporous and exhibits an optimal phosphorous removal capacity in combination with a sufficient bleaching action, the temperature during the various preparation steps should be higher than 30° C., and concomitantly lower than 60° C. Exceeding the lower limit or upper limit for the temperature, the macroporosity, phosphorous removal capacity and bleaching action will decrease. It is noted that only after a calcining treatment these synthetic, macroporous, amorphous alumina silicas possess bleaching activity.

The synthetic, macroporous, amorphous alumina silicas according to the invention exhibiting the excellent phosphorous removal capacity may be prepared according to a specific preparation method according to the invention, comprising the steps of:

i) contacting an aqueous solution of a silica with an acid at a $pH_1$ of 8-11 at a temperature ($T_1$) of about 35°-55° C. and at a residence time ($t_1$) of about 30-120 seconds;

ii) allowing the formation of a silica hydrogel at a temperature ($T_2$) of about 35°-55° C., at a $pH_2$ of 8-11, and at a residence time ($t_2$) of at least 30 minutes;

iii) mixing the silica hydrogel formed with an aqueous aluminum solution having a $pH_3$ of about 4-6, at a residence time ($t_3$) of at least 15 minutes and at a temperature ($T_3$) of 35°-55° C.; and iv) removing and drying the formed synthetic, macroporous, amorphous, alumina silica.

The phosphorous removal capacity and the bleaching activity of the alumina silicas according to the invention are improved if the temperature during the various preparation steps is maintained at 40°-55° C., preferably at 40°-50° C.

Generally the residence time during the hydrogel formation is 30-120 minutes, preferably 50-100 minutes, most preferably 65-95 minutes. The residence time during the alumina silica formation is generally 15-160 minutes, preferably 15-45 minutes.

Calcination is normally carried out at a temperature $T_4$ of at least about 300° C. Preferably, the calcination temperature $T_4$ is in the range of about 500°-900° C., most preferably in the range of about 650°-800° C.

When used in a process according to the invention for refining glyceride oil, the alumina silicas according to the invention result in a phosphorous removal of more than 100 mg/kg P/% by wt alumina silica and iron removal of about 1 mg/kg Fe/% by wt alumina silica. The removal of these impurities is substantially proportional to the amount of alumina silica added.

The analytical data and the flavour score of glyceride oil refined according to the process of the invention is almost identical to the respective data and flavour score of the same glyceride oil refined in a chemical refining process. Accordingly, the alumina silicas according to the invention exhibit further bleaching capacity.

A preferred feature of the refining process according to the invention is the re-use of the alumina silicas according to the invention, which are recycled after regeneration by calcination in order to remove residual oil. The specific textural properties of the alumina silicas are substantially maintained, and from a practical point of view the alumina silicas may be re-used at least two times as such or in an admixture with fresh amorphous alumina silica. After one or two regeneration treatments the alumina silicas according to the invention still exhibit a remarkable phosphorous removal capacity of more than 120 mg/kg P/1% by wt or 90 ppm P/1% by wt alumina silica respectively.

After refining with the alumina silicas according to the invention the refined oil may be further refined using a bleaching earth. An intermediate alumina silica removal step may be avoided if, according to a preferred processing feature, the glyceride oil is refined with bleaching earth while the synthetic, macroporous, amorphous alumina silica is still present. Preferably the bleaching earth is added after a period of time sufficient for the removal of most residual contaminants by the alumina silicas according to the invention.

The synthetic, macroporous, amorphous alumina silicas, their preparation method and the refining processes of glyceride oils in which these alumina silicas are used, are defined and disclosed in terms of physical and chemical properties or features. Standard test or measuring methods used to determine these properties or features are:

(i) Surface area:

Surface area is determined by standard nitrogen adsorption methods of Brunauer, Emmett and Teller (BET) using a multipoint method with an Autosorb-6 apparatus supplied by Quantachrome Corp. (USA). The BET surface area recorded is that occurring over the range of calculated pore diameter of less than 200 nm. The samples were outgassed under vacuum at 270° C. for 8 hours.

Surface area in pores having a pore diameter in the range of 4-20 nm was calculated according to Barrett, Joyner and Halenda (E. P. Barrett, L. G. Joyner and P. P. Halenda, J. Amer. Chem. Soc. 73 (1951) 373). The determination of the surface area in pores of a certain size is obtained by measurement of the nitrogen adsorption isotherm (77K). Owing to pore interconnectivity the adsorption isotherm is employed rather than desorption data and the surface area in relation to the pore size distribution is calculated using the assumption of cylindrical pores. A summary of the BET nitrogen adsorption technique is given by S. Lowell and J. E. Shields (in: Powder, Surface Area and Porosity, $2^{nd}$ edition 1984 edited by B. Scarlett and published by Chapman and Hall, London, Powder Technology Series).

(ii) Pore volume

Pore volumes are determined (in ml/g) by standard mercury intrusion procedures in pores having a pore diameter larger than 3.6 nm, e.g. in the range of 4-20 nm diameter, using a Micromeritics Autopore 9220 mercury porosimeter. The pore diameter is calculated from the Washburn equation, using values of surface tension for mercury of 485 dynes/cm and contact angle of 140°. Prior to measurement, the sample was outgassed at room temperature for 15 minutes to a pressure of 7 Pascal.

A summary of the mercury porosimetry technique is given by S. Lowell and J. E. Shields (in: Powder, Surface Area and Porosity, $2^{nd}$ edition 1984 edited by B. Scarlett and published by Chapman and Hall, London, Powder Technology Series).

The content of free fatty acids (FFA), the peroxide value (PV), the anisidin value (AV), the extinction at 232 nm ($E_{232}$) and at 268 nm ($E_{268}$) in a measuring cell having a cell length of 1 cm were determined using standard analytical methods. The Lovibond colour (Lov colour) was measured by a manual test using an apparatus in which the ratio of the yellow filter and the red filter is 10:1.

Various examples of synthetic, macroporous, amorphous alumina silicas will now be given to illustrate the invention, these examples should not be construed such as to limit the invention thereto.

EXAMPLE 1

Preparation of alumina silica.

Various alumina silicas were prepared using a precipitation procedure comprising an acid treatment, a hydrogel formation and an alumina silica formation. The preparation conditions for two alumina silicas according to the invention and two alumina silicas not according to the invention are shown in table 1.

In detail in the acid treatment step an aqueous solution of sodium silicate (5% by wt) is contacted in a first stirred reactor with a sulphuric acid solution ($pH_1$, residence time $t_1$ (sec), temperature $T_1$ (°C.)).

For the subsequent hydrogel formation the mixture of the first reactor is passed into a second reactor ($pH_2$, residence time $t_2$(min), temperature $T_2$(°C.)). The formed silica hydrogel is the passed into a third reactor in which the alumina silica formation takes place.

In the third reactor an aluminum sulphate solution (aluminum content 5% by wt) is added to the third reactor and the $pH_3$ is adjusted using 4N NaOH solution (temperature $T_3$(°C.), residence time $t_3$(min)).

Thereafter the alumina silica formed is removed by filtration, the filter cake is re-slurred with water and refiltered. This washing step is repeated. The filter cake obtained may be re-slurried in a 10% ammonium carbonate solution. This slurry is stirred for one hour at room temperature and the cake is filtered off. Thereafter the cake is washed twice with hot water, re-slurried in water to give a dispersion comprising about 5-10% dry material and the dispersion is spray-dried. The product is further calcinated by heating for one hour at 700° C. in a furnace provided with an air circulation.

Table 1 shows that especially the temperature $T_1$ the acid treatment and the temperature $T_2$ in the hydrogel formation step are critical for obtaining the alumina silica according to the invention, of which the phosphorous removal capacity properties are shown in table 2. Table 2 shows that the excellent phosphorous removal capacity is linked with a large surface area (m²/g) and large pore volume (ml/g) in pores having a pore diameter in the range of about 4-20 nm. the water-degummed soybean oil used for the determination of the phosphorous removal capacity contained 180 mg/kg P.

EXAMPLE 2

Alumina silica 1 according to the invention disclosed in example 1 is used in a physical refining process.

800 g water-degummed soybean oil (147 mg/kg P and 1.3 mg/kg Fe) is heated in a turbine stirred cylindrical vessel equipped with 4 baffles. There is essentially no head space above the oil level. 0.15% of a 50% citric acid solution is added, and the mixture is stirred for 15 min. Thereafter 0.3% water is added and stirring is maintained during 15 min.

Then 1% by wt (8 g alumina silica 1 according to the invention) is added and the slurry is stirred during 90 min.

The oil is subjected to filtration using filter paper and the results are shown in table 3.

The same refining process is repeated after once and twice regenerating the alumina silica used. The regeneration treatment comprises the washing of the spent alumina silica with hexane and subsequently heating of the washed alumina silica at 700° C. during an appropriate period of time.

Table 4 shows the accumulation of phosphorous and various metals adsorbed on the alumina silica as function of its regeneration. The element concentrations are measured by röntgen fluorescence.

EXAMPLE 3

700 g super-degummed rapeseed oil (20 mg/kg P, 0.2 mg/kg Fe) is heated up to 90° C. in a turbine stirred cylindrical vessel equipped with 4 baffles. There is essentially no headspace above the oil level. 0.1% w/w of a 50% citric acid solution is added and the mixture is stirred during 15 minutes. Thereafter, 0.2% w/w water is added and stirring is continued for 15 minutes. Thereafter 1% by wt alumina silica 1 according to the invention is added, and the dispersion is stirred during 30 minutes. Without applying intermediate filtration the oil is dried under vacuum until the water content in the oil is below 0.1% w/w. Thereafter the oil is stirred for another 15 minutes. The alumina silica is filtered off using filter paper and the results are shown in table 5. The same procedure is repeated using silica alumina 2 according to the invention, and using the commercially available silica hydrogel Trisyl ® for comparison. From the results it shows that in all cases P and Fe are removed to below 2 mg/kg and 0.01 mg/kg, respectively. Furthermore, it shows that the alumina silicas according to the invention have significantly bleached (expressed as removal of green pigments and as removal of Lovibond colour, Yellow+Red+Blue) the oil, whereas the Trisyl ® has hardly bleached the oil.

EXAMPLE 4

800 g water-degummed soybean oil (98 mg/kg P, 0.96 mg/kg Fe) is heated in a turbine stirred cylindrical vessel equipped with 4 baffles. There is essentially no head space above the oil level.

0.15% w/w of a 50% citric acid solution is added and the mixture is stirred during 15 min. Thereafter 0.3% w/w water is added and stirring is continued for 15 min.

Thereafter 1% by wt alumina silica 1 as described in example 1 is added, and the dispersion is stirred during 90 min. Solid particles are filtered and the oil is bleached using 1% Tonsil OptimumR at 90° C. for 30 min. The bleaching earth is filtered off, whereafter the bleached oil is steam-stripped at 230° C. for 3 hours. The analytical data of the physically refined soybean oil (nr. 3) is compared with those of the original crude oil (nr. 1) and with the same oil after chemically caustic refining (nr. 2).

The above-described refining process is repeated after regenerating the alumina silica using a regeneration treatment described in example 2. The analytical data of the refined oil (nr. 4) is also disclosed in table 6.

Finally, refined oil (nr. 5) resulted from a refining process according to the invention in which alumina silica was still present during the bleaching step with the bleaching earth.

All refined oils (nrs. 2-5) comprising less than 1 mg/kg phosphorous containing compounds and less than 0.02 mg/kg Fe, were tasted by a taste-panel after storage for 0-10 weeks in the dark at 15° C. After storage periods of 2-10 weeks the oils exhibited a small to moderate off-flavour taste still suitable for processing in food products.

TABLE 1 preparation conditions of various alumina silicas

| alumina silica | acid treatment | | | hydrogel formation | | | alumina silica formation | | | calcination |
|---|---|---|---|---|---|---|---|---|---|---|
| | $T_1$ (°C.) | $t_1$ (sec) | $pH_1$ (−) | $T_2$ (°C.) | $t_2$ (min) | $pH_2$ (−) | $T_3$ (°C.) | $t_3$ (min) | $pH_3$ (−) | $T_4$ (°C.) |
| invention | | | | | | | | | | |
| 1 | 50 | 45 | 9.9 | 50 | 60 | 9.9 | 50 | 20 | 5.0 | 700 |
| 2 | 40 | 60 | 9.4 | 40 | 90 | 9.4 | 40 | 40 | 5.0 | 700 |
| comparative | | | | | | | | | | |
| 3 | 60 | 15 | 10.0 | 60 | 80 | 10.0 | 50 | 13 | 5.0 | 700 |
| 4 | 80 | 45 | 9.9 | 80 | 60 | 9.9 | 50 | 20 | 5.0 | 700 |

TABLE 2 properties and phosphorous removal capacity (delta-P) of the alumina silicas shown in table 1

| alumina silica | surface area | | intrusion volume | | delta P (mg/kg P/1%) |
|---|---|---|---|---|---|
| | pore diam. 4–20 nm ($m^2/g$) | total ($m^2/g$) | pore diam. 4–20 nm (ml/g) | total (ml/g) | |
| invention | | | | | |
| 1 | 203 | 312 | 0.75 | 3.35 | 185 |
| 2 | 276 | 394 | 0.75 | 2.36 | 170 |
| comparative | | | | | |
| 3 | 56 | 160 | 0.18 | 2.55 | 60 |
| 4 | 40 | 134 | 0.14 | 2.50 | 90 |

TABLE 3 phosphorous and iron content (mg/kg) of soybean oil after refining using fresh alumina silica 1 according to the invention and its regenerated forms

| regeneration | $P^{1)}$ | $Fe^{1)}$ | P-removal (mg/kg P/1%) |
|---|---|---|---|
| — | <2 | 0.04 | >145 |
| 1x | 18 | 0.19 | 130 |
| 2x | 42 | 0.39 | 105 |

$^{1)}$contents (mg/kg) after filtration

TABLE 4 content of metals and other elements (% by wt) of alumina silica 1 as function of regeneration

| regeneration | P | Fe | Mg | Ca | Al | Si |
|---|---|---|---|---|---|---|
| — | 0.01 | 0.028 | 0.02 | 0.008 | 6.7 | 38.7 |
| 1x | 1.0 | 0.037 | 0.26 | 0.54 | 6.3 | 36.5 |
| 2x | 1.9 | 0.044 | 0.50 | 1.05 | 5.9 | 34.5 |

TABLE 5 phosphorous, iron and green pigment contents (mg/kg), and Lovibond colour (Y + R + B, 2 inch cell) of rapeseed oil after refining using alumina silicas 1 and 2 according to the invention, and Trisyl$^R$

| Adsorbent | $P^{1)}$ | $Fe^{1)}$ | Green pigments$^{1)}$ | Lovibond$^{1)}$ Y + R + B |
|---|---|---|---|---|
| — | 20 | 0.20 | 9.1 | 55 + 5.5 + 1.0 |
| No. 1 | <1 | <0.01 | 1.9 | 28 + 2.8 + 0.2 |
| No. 2 | <1 | <0.01 | 1.7 | 26 + 2.6 + 0.1 |
| Trisyl$^{R2)}$ | 1.2 | <0.01 | 8.0 | 67 + 6.7 + 0.9 |

$^{1)}$contents after filtration
$^{2)}$obtained from the Davison Chemical Division of W. R. Grace & Co.

TABLE 6 analytical data of chemically and physically refined soybean oil

| No | Refining | Regeneration | FFA (%) | PV (meq $O_2$/kg) | AV | $E_{232}$ (1%/1 cm) | $E_{268}$ | Lov colour (5¼") |
|---|---|---|---|---|---|---|---|---|
| 1 | — | — | 0.44 | 3.2 | 0.9 | 2.6 | 0.4 | — |
| 2 | chemical | — | 0.01 | 0.0 | 1.1 | 4.0 | 1.5 | 3 + 0.3 |
| 3 | physical | — | 0.01 | 0.0 | 2.3 | 3.8 | 1.7 | 3 + 0.3 |
| 4 | physical | 1x | 0.02 | 0.0 | 2.1 | 3.7 | 1.5 | 3 + 0.3 |
| 5 | physical | — | 0.02 | 0.1 | 2.2 | 3.6 | 1.2 | 3 + 0.3 |

We claim:

1. Synthetic, macroporous, amorphous, alumina silica having a surface area of at least 150 $m^2/g$, and a pore volume of at least 0.6 ml/g and a surface area of at least 175 $m^2/g$ in pores having a pore diameter in the range of about 4–20 nm.

2. Alumina silica as claimed in claim 1, having a total surface area of at least 250 $m^2/g$.

3. Alumina silica according to claim 1, having a surface area of at least 200 $m^2/g$ in pores having a pore diameter in the range of about 4–20 nm.

4. Alumina silica according to claim 1, having a surface area in the range of about 150–300 $m^2/g$ in pores having a pore diameter in the range of about 4–20 nm.

5. Alumina silica according to claim 4, having a surface area in the range of about 200–300 $m^2/g$ in pores having a pore diameter in the range of about 4–20 nm.

6. Alumina silica as claimed in claim 1, having a total surface area of at least 200 $m^2/g$.

7. Alumina silica as claimed in claim 6, having a total surface area in the range of about 200–500 $m^2/g$.

8. Alumina silica as claimed in claim 7, having a total surface area in the range of about 300–450 $m^2/g$.

9. Alumina silica as claimed in claim 1, having a pore volume of at least 0.65 ml/g in pores having a pore diameter in the range of about 4–20 nm.

10. Alumina silica according to claim 9, having a pore volume in the range of 0.65–1.0 ml/g in pores having a pore diameter in the range of about 4–20 nm.

11. Alumina silica as claimed in claim 10, having a pore volume in the range of about 0.7–0.9 ml/g in pores having a pore diameter in the range of about 4–20 nm.

12. Alumina silica as claimed in claim 1, having a total pore volume in the range of about 2–4 ml/g.

13. Alumina silica as claimed in claim 12, having a total pore volume in the range of about 2.7–3.5 ml/g.

14. Alumina silica as claimed in claim 1, having a phosphorous removal capacity of at least 100 mg/kg P/1% by wt.

15. Alumina silica according to claim 1, having a phosphorous removal capacity in the range of about 100–250 mg/kg P/1% by wt alumina silica.

16. Alumina silica as claimed in claim 1, which is selected from the group consisting of precipitated and calcinated alumina silicas.

17. Method for preparing a synthetic, macroporous, amorphous, alumina silica comprising the steps of:
   i) contacting an aqueous solution of a silica with an acid at a $pH_1$ of 8-11 at a temperature ($T_1$) of about 35°-55° C. and at a residence time ($t_1$) of about 30-120 seconds;
   ii) allowing the formation of a silica hydrogel at a temperature ($T_2$) of about 35°-55° C., at a $pH_2$ of 8-11, and at a residence time ($t_2$) of at least 30 minutes;
   iii) mixing the silica hydrogel formed with an aqueous aluminum solution having a $pH_3$ of about 4-6, at a residence time ($t_3$) of at least 15 minutes and at a temperature ($T_3$) of 35°-55° C.; and
   iv) removing and drying the formed macroporous, amorphous, synthetic, alumina silica.

18. Method as claimed in claim 17, wherein the temperature $T_1$ is 40°-55° C.

19. Method as claimed in claim 17, wherein the temperature $T_2$ is 40°-55° C.

20. Method as claimed in claim 17, wherein the temperature $T_3$ is 40°-55° C.

21. Method as claimed in claim 17, wherein the residence time $t_2$ is 30-120 minutes.

22. Method as claimed in claim 17, wherein the residence time $t_3$ is 15-60 minutes.

23. Method as claimed in claim 17, further comprising the step of:

v) calcining the macroporous, amorphous, synthetic, alumina silica at a temperature $T_4$ of at least about 300° C.

24. Alumina silica according to claim 4, having a surface area in the range of about 200-250 $m^2/g$ in pores having a pore diameter in the range of about 4-20 nm.

25. Alumina silica as claimed in claim 1, having a total surface area of at least 300 $m^2/g$.

26. Alumina silica as claimed in claim 1 having a phosphorus removal capacity of at least 150 mg/kg P/1% by wt.

27. Alumina silica as claimed in claim 1 having a phosphorus removal capacity of at least 175 mg/kg P/1% by wt.

28. Alumina silica according to claim 1, having a phosphorus removal capacity in the range of about 150-200 mg/kg P/1% by wt.

29. Method as claimed in claim 17, wherein the temperature $T_1$ is 40°-50° C.

30. Method as claimed in claim 17, wherein the temperature $T_2$ is 40°-50° C.

31. Method as claimed in claim 17, wherein the temperature $T_3$ is 40°-50° C.

32. Method as claimed in claim 17, wherein the residence time $t_2$ is 50-100 minutes.

33. Method as claimed in claim 17, wherein the residence time $t_2$ is 65-95 minutes.

34. Method as claimed in claim 17, wherein the residence time $t_3$ is 15-45 minutes.

35. Method as claimed in claim 23, wherein the temperature $T_4$ is in the range of about 500°-900° C.

36. Method as claimed in claim 23, wherein the temperature $T_4$ is in the range of about 650°-800° C.

* * * * *